US010309130B2

(12) United States Patent
Schiffer et al.

(10) Patent No.: US 10,309,130 B2
(45) Date of Patent: Jun. 4, 2019

(54) MOTOR VEHICLE DOOR LOCK

(71) Applicant: KIEKERT AG, Heiligenhaus (DE)

(72) Inventors: Holger Schiffer, Meerbusch (DE); Michael Scholz, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 489 days.

(21) Appl. No.: 14/912,186

(22) PCT Filed: Jul. 15, 2014

(86) PCT No.: PCT/DE2014/100254
§ 371 (c)(1),
(2) Date: Apr. 14, 2016

(87) PCT Pub. No.: WO2015/024555
PCT Pub. Date: Feb. 26, 2015

(65) Prior Publication Data

US 2016/0356065 A1 Dec. 8, 2016

(30) Foreign Application Priority Data

Aug. 21, 2013 (DE) ........................ 10 2013 109 051

(51) Int. Cl.
*E05B 83/24* (2014.01)
*E05B 81/20* (2014.01)
(Continued)

(52) U.S. Cl.
CPC .............. *E05B 81/20* (2013.01); *E05B 79/04* (2013.01); *E05B 81/06* (2013.01); *E05B 81/44* (2013.01);
(Continued)

(58) Field of Classification Search
CPC ............. Y10T 292/696; Y10T 292/699; Y10T 292/702; Y10S 292/60; E05B 79/04; E05B 81/20
(Continued)

(56) References Cited

U.S. PATENT DOCUMENTS 4,861,089 A 8/1989 Compeau
4,982,984 A * 1/1991 Yokota .................... E05B 81/22 292/201
(Continued)

FOREIGN PATENT DOCUMENTS

CN 2563259 Y 7/2003
CN 2644589 Y 9/2004
(Continued)

OTHER PUBLICATIONS

Machine Translation of Abstract for FR2889554A1 by Lexis Nexis Total Patent on Apr. 6, 2016.
(Continued)

*Primary Examiner* — Carlos Lugo
(74) *Attorney, Agent, or Firm* — Woodard, Emhardt, Henry, Reeves & Wagner, LLP

(57) ABSTRACT

The invention relates to a motor vehicle door lock which is equipped with a body-side lock housing and a hood-or-door-side locking bolt or vice-versa. The invention also relates to a locking and/or opening device. According to the invention, the locking and/or opening device engages on the outer side on the lock housing for the adjustment thereof with respect to a fixed base element in the course of a closing/opening process.

18 Claims, 2 Drawing Sheets

(51) Int. Cl.
*E05B 79/04* (2014.01)
*E05B 81/06* (2014.01)
*E05B 81/44* (2014.01)
*E05B 77/08* (2014.01)
*E05B 47/00* (2006.01)

(52) U.S. Cl.
CPC .............. *E05B 83/24* (2013.01); *E05B 77/08* (2013.01); *E05B 2047/0025* (2013.01); *Y10S 292/60* (2013.01); *Y10T 292/696* (2015.04); *Y10T 292/699* (2015.04); *Y10T 292/702* (2015.04)

(58) Field of Classification Search
USPC .......................................................... 292/201
See application file for complete search history.

(56) References Cited

U.S. PATENT DOCUMENTS

| | | | | | | |
|---|---|---|---|---|---|---|
| 5,020,838 | A | * | 6/1991 | Fukumoto | E05B 81/14 | 292/201 |
| 5,222,775 | A | | 6/1993 | Kato | | |
| 5,273,325 | A | * | 12/1993 | Zimmermann | E05B 81/22 | 292/216 |
| 5,443,292 | A | * | 8/1995 | Shimada | E05B 81/20 | 292/201 |
| 5,938,252 | A | * | 8/1999 | Uemura | E05B 81/14 | 292/201 |
| 5,938,254 | A | * | 8/1999 | Weyerstall | E05B 81/22 | 292/144 |
| 6,419,286 | B1 | * | 7/2002 | Szablewski | E05B 77/24 | 292/216 |
| 6,789,825 | B2 | * | 9/2004 | Kalargeros | E05B 85/26 | 292/201 |
| 6,805,386 | B2 | * | 10/2004 | Ehret | E05B 81/20 | 292/141 |
| 7,000,956 | B2 | * | 2/2006 | Fisher | E05B 81/14 | 292/198 |
| 7,195,292 | B2 | * | 3/2007 | Ketelsen | E05B 85/26 | 292/201 |
| 7,367,598 | B2 | * | 5/2008 | Arabia, Jr. | E05B 81/22 | 292/201 |
| 7,789,440 | B2 | * | 9/2010 | Graute | E05B 85/26 | 292/216 |
| 7,938,458 | B1 | * | 5/2011 | Zweibohmer | E05B 15/0006 | 292/197 |
| 7,954,898 | B2 | * | 6/2011 | Van De Geer | B60N 2/01583 | 292/200 |
| 8,596,695 | B2 | * | 12/2013 | Inan | E05B 85/26 | 292/216 |
| 2003/0094820 | A1 | * | 5/2003 | Erices | E05B 81/22 | 292/341.16 |
| 2007/0029814 | A1 | * | 2/2007 | Coleman | E05B 81/14 | 292/201 |
| 2011/0260475 | A1 | * | 10/2011 | Spurr | E05B 81/14 | 292/195 |

FOREIGN PATENT DOCUMENTS

| | | | | | |
|---|---|---|---|---|---|
| CN | 201078129 | Y | | 6/2008 | |
| DE | 3721962 | A1 | | 1/1989 | |
| DE | 19520359 | A1 | * | 12/1996 | E05B 81/20 |
| DE | 19835994 | A1 | * | 2/2000 | E05B 81/20 |
| DE | 29915905 | U1 | | 4/2000 | |
| DE | 10306605 | A1 | | 8/2004 | |
| DE | 102004046162 | A1 | | 4/2005 | |
| DE | 102004015819 | A1 | | 11/2005 | |
| DE | 102005048564 | A1 | * | 4/2007 | E05B 81/14 |
| DE | 102005060750 | A1 | | 6/2007 | |
| DE | 102006002338 | A1 | | 7/2007 | |
| DE | 102006012090 | B3 | * | 10/2007 | B60R 21/34 |
| DE | 102006031617 | A1 | | 1/2008 | |
| DE | 102007056691 | A1 | | 6/2009 | |
| DE | 102009018188 | A1 | | 11/2010 | |
| DE | 102014208808 | A1 | * | 11/2015 | E05B 79/04 |
| EP | 1882617 | A2 | | 1/2008 | |
| EP | 2096007 | A1 | | 9/2009 | |
| EP | 1489252 | B1 | | 12/2012 | |
| FR | 2889554 | A1 | | 2/2007 | |

OTHER PUBLICATIONS

Machine Translation of DE102004015819A1 by Lexis Nexis Total Patent on Apr. 6, 2016.
Machine Translation of DE102005060750A1 by Lexis Nexis Total Patent on Apr. 6, 2016.
Machine Translation of DE102006002338A1 by Lexis Nexis Total Patent on Apr. 6, 2016.
Machine Translation of DE102006031617A1 by Lexis Nexis Total Patent on Apr. 6, 2016.
Machine Translation of DE102009018188A1 by Lexis Nexis Total Patent on Apr. 6, 2016.
Machine Translation of DE10306605A1 by Lexis Nexis Total Patent on Apr. 6, 2016.
Machine Translation of DE29915905U1 by Lexis Nexis Total Patent on Apr. 6, 2016.
Machine Translation of DE3721962A1 by Lexis Nexis Total Patent on Apr. 6, 2016.
Machine Translation of EP1489252B1 by Lexis Nexis Total Patent on Apr. 6, 2016.
Machine Translation of EP1882617A2 by Lexis Nexis Total Patent on Apr. 6, 2016.
Machine Translation of EP2096007A1 by Lexis Nexis Total Patent on Apr. 6, 2016.
Chinese Office Action issued in related CN201480046551.X dated Apr. 6, 2017 and partial English translation.
German Search Report issued in related DE102013109051.6 dated Jun. 23, 2014.
Machine translation of CN201078129Y by Lexis Nexis Total Patent on Jan. 25, 2019 (pp. 16).
Machine translation of CN2563259Y by Lexis Nexis Total Patent on Jan. 25, 2019 (pp. 11).
Machine translation of CN2644589Y by Lexis Nexis Total Patent on Jan. 25, 2019 (pp. 22).
Machine translation of DE102004046162A1 by Lexis Nexis Total Patent on Jan. 25, 2019 (pp. 35).
Machine translation of DE102007056691A1 by Lexis Nexis Total Patent on Jan. 25, 2019 (pp. 18).

* cited by examiner

MOTOR VEHICLE DOOR LOCK

BACKGROUND

The invention relates to a motor vehicle door lock with a body-side latch housing and a hood- or door-side locking bolt or vice versa and with a locking and/or opening device.

The latch housing normally contains a frame box and a latch cover for locking the motor vehicle door lock. The frame box normally contains a locking mechanism comprising a catch and pawl, interacting therewith. The catch and the thus defined motor vehicle door latch interact with the locking bolt in the known manner.

As usual, the latch housing can be arranged on the hood- or door-side. In the first case, the latch housing is fixed on a car body by, for instance, bolting. In the second option, the latch housing and thus also the door lock is fixed on the inside or on a door, a hood or a flap or similar.

Consequently, available latches include side door latches, tailgate latches and hood latches or bonnet latches. All of these latches are covered by the generic term motor vehicle door latch and, when combined with the locking bolt, by the generic term motor vehicle door lock.

According to the invention, the latch housing is normally secured to the body side and is thus arranged on an associated car body. In contrast, the locking bolt is connected to a hood so that the invention refers in most cases to a hood latch or bonnet latch. The arrangement can, however, generally also be the other way around. In this case, the locking pin is connected to the body or motor vehicle body, whilst the latch housing and thus the motor vehicle door latch is secured on the bonnet or generally on the door side.

Practical applications and the generic state of the art according to EP 1 489 252 B1 advantageously contain locking and opening aids, generally ensuring that once a certain preliminary closing position has been reached, the distance between the body and the bonnet or door to be closed is reduced (closing position). This is generally achieved with the aid of a motor or with the aid of a motorized drive, although mechanical locking and opening is also possible and covered by the invention. Furthermore, also opening devices exist, with the aid of which the respective hood or motor vehicle hood or door or motor vehicle door can be opened or opened out in relation to the motor vehicle body. Such locking/opening devices can, generally also be combined.

In general, designs do, however, contain in most cases only one closing aid or closing device, moving for instance a motor vehicle door from the pre-ratchet position to the main ratchet position with the aid of a motor. For this purpose, a rocker is acted upon in the generic state of the art as disclosed in EP 1 489 252 B1. The motorized drive acts on a toggle lever element containing two toggle levers. It is thus ensured that during a mechanical closing operation mechanical actuation of the locking mechanism is possible even if the motorized drive malfunctions. This arrangement has proven to be successful.

More recently and, in particular, in so-called hood latches, i.e. motor vehicle door latches on a motor vehicle door hood or in the area of the motor vehicle hood, there is a requirement for making a gap between the motor vehicle door or the motor vehicle hood and the motor vehicle body as small as possible and for reducing the gap to 0 mm or nearly 0 mm. This requirement is not only for aesthetical reasons, requiring a smooth and continuous surface in modern motor vehicles. Moreover, the size of the gap has, in particular in this area, a direct effect on the air turbulence in the front area, which depending on its origin and form, can negatively influence air resistance. Convincing solutions have so far been missing in this area. The invention aims to remedy this.

SUMMARY

The invention is based on the technical problem of further developing such a motor vehicle door lock in such a way that with simple means the smallest possible gap between the body and door or hood can be achieved.

In order to solve this technical problem, a generic motor vehicle door lock of the invention is characterized by the locking and/or opening device engaging on the outside of the latch housing for the adjustment thereof with respect to a fixed base element during a closing/opening process.

As the latch housing is typically arranged on the body side, i. e. on a motor vehicle body or is connected to the motor vehicle body, the fixed base element is part of this motor vehicle body. Generally, the motor vehicle door latch or hood latch of the invention is arranged in the area of a top front support at the front of the motor vehicle body normally arranged or extending horizontally.

In an advantageous design, the latch housing is connected pivotably around an axis or a rotation axis to the respective base element. This means that the movement of the latch housing as part of the locking/opening process corresponds to a pivoting movement of the latch housing around the respective axis or rotation axis. For this purpose, the axis or rotation axis is generally defined in such a way that, in the example, the top front support of the motor vehicle body contains a respective bolt or pin on which the latch housing is pivotably mounted.

In order to achieve a particularly stable design at this point, the frame box is generally pivotably mounted on said pin. In contrast, the latch cover is connected to the frame box and is, so to speak, carried along during a pivoting movement of the frame box.

The described locking/opening process can generally be carried out mechanically. This can, for instance, be achieved by a Bowden cable that can be manually activated, acting on the locking and/or opening device. Generally, a motorized drive is, however, provided for the locking and/or opening device. It has proven to be advantageous for the motorized drive to act eccentrically on the closing/opening device. It is also advantageous for the motorized drive only to act on the closing or opening device when the door lock is in its main ratchet position.

Generally, the locking and/or opening device essentially comprises a rocker and a pawl, engaging in the latch housing. The rocker allows for a relatively high torque to be exerted on the latch housing even if a compact motorized drive, producing only limited power, is used.

The rocker is generally pivotably connected to the base element. It has proven to be advantageous for the rocker and the latch housing to be connected to the base element so that they can be pivoted along the same axis. In this case, the pin at the top front support of the motor vehicle body advantageously acts as a common rotation axis for the latch housing and the rocker. This also provides a particularly compact and hardly protruding design.

The pawl for its part is pivotably mounted on the rocker. In this arrangement, the pawl may be pretensioned with the aid of a spring. It is also proven to be advantageous for the pawl to engage in a projection on the latch housing. For reasons of stability, this projection can advantageously be arranged on the frame box.

For actuating and pivoting the rocker around the axis of rotation shared with the latch housing, the rocker mainly contains a slot into which an actuating pin can engage. The actuating pin in turn is advantageously acted upon by means of the motorized drive.

The design is normally such that the actuating pin is arranged on a driven wheel. The driven wheel can be rotated by a motor or electric motor. The drive shaft of the electric motor contains a worm, meshing with teeth arranged on the outer side of the wheel in order to move the wheel in counterclockwise or clockwise direction around an associated axis. This causes the actuating pin to move along a circular arc and within the slot of the rocker. The principle design of such a motorized drive is disclosed in DE 299 15 905 U1.

This means that the actuating pin carries out circular movements inside the slot of the rocker that are initiated by the motorized drive. In this way, the rocker and thus the latch housing can be pivoted around the common axis in respect to the base element. A pivoting movement of the rocker also causes the latch housing to be carried along by the pawl during the rotational movement of the rocker.

The result is a motor vehicle door lock particularly suited for providing very small gap widths between the associated door and hood and body and that can be set down to 0 mm or nearly 0 mm. Generally, the invention achieves this by the entire latch housing being pivoted in relation to the base element or a top and mostly horizontally arranged front support of the motor vehicle body with the aid of the locking and/or opening device. This means that the locking and/or opening device does expressly not engage with a locking mechanism mounted in the associated motor vehicle door lock.

Instead, the locking mechanism is initially moved to a main closing or main ratchet position during closing of the door or hood. This position commences the closing or opening process of the invention.

During this pulling closed or closing operation, the entire latch housing with the locking mechanism in the main ratchet and thus the locking pin retained therein, is moved around the rotation axis with respect to the motor vehicle body. Such a movement can be carried out particularly delicately and, in comparison to a closing movement acting on the catch, with much larger lever arms and thus respectively higher torques. As a result, basically any gap can be produced between the door or hood and the motor vehicle body, down to 0 mm or nearly 0 mm. This is all achieved in a simple and functional design. These are the main advantages of the invention.

Below, the invention is explained in detail with reference to a drawings showing only one example, in which:

DETAILED DESCRIPTION OF THE DRAWINGS

The figures show a motor vehicle door lock which essentially has a basic design, comprising a latch housing 1 on the body side and a locking pin 2 on the hood side. This means that the locking pin 2 is connected to a hood or motor hood 3, only indicated by a dashed line. This means that the example shows a hood latch although the invention is not limited to this.

Figure 1:
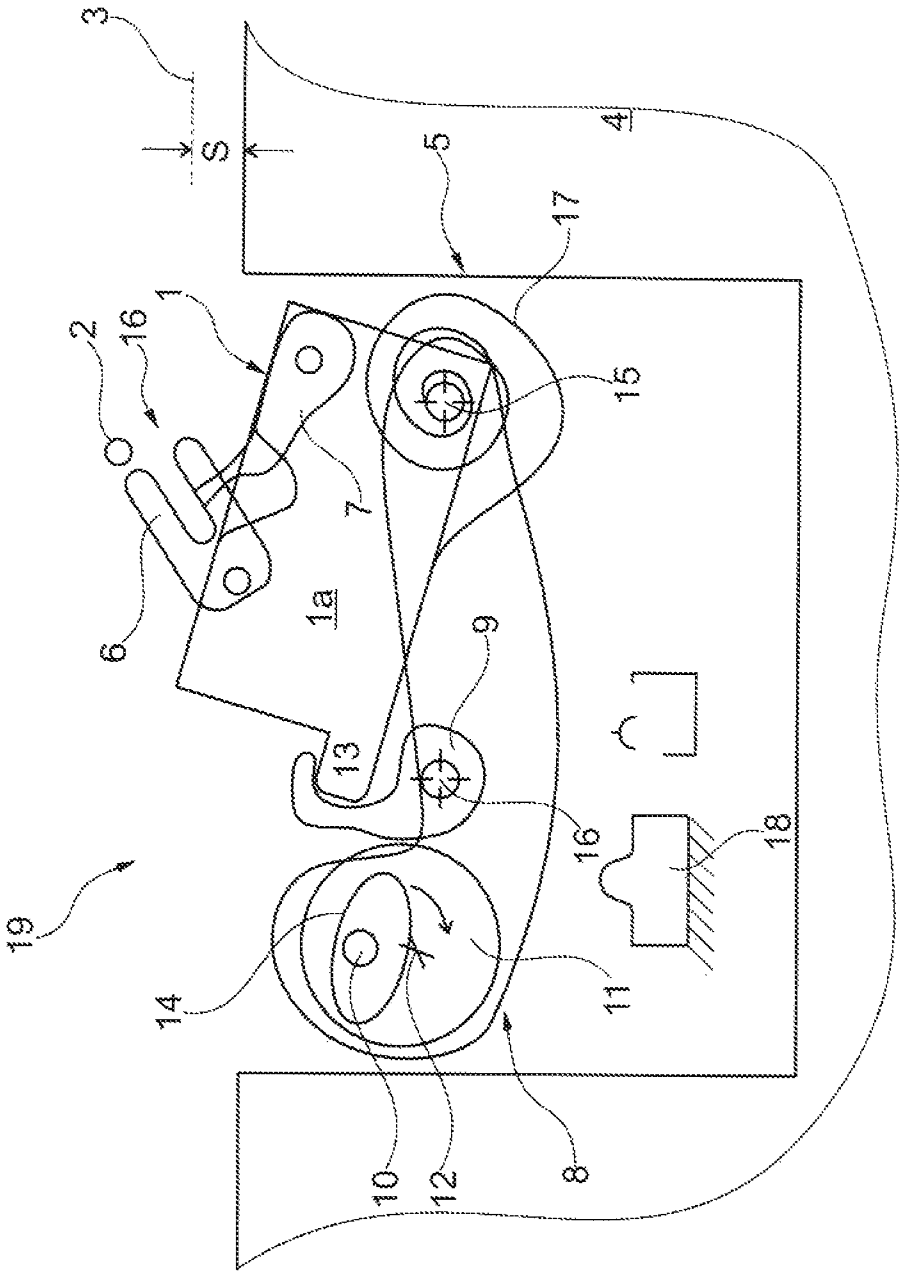
FIG. 1 shows the motor vehicle door lock of the invention with an opened hood in the example and FIG. 2 shows the object of FIG. 1 with the hood closed.
Figure 2:
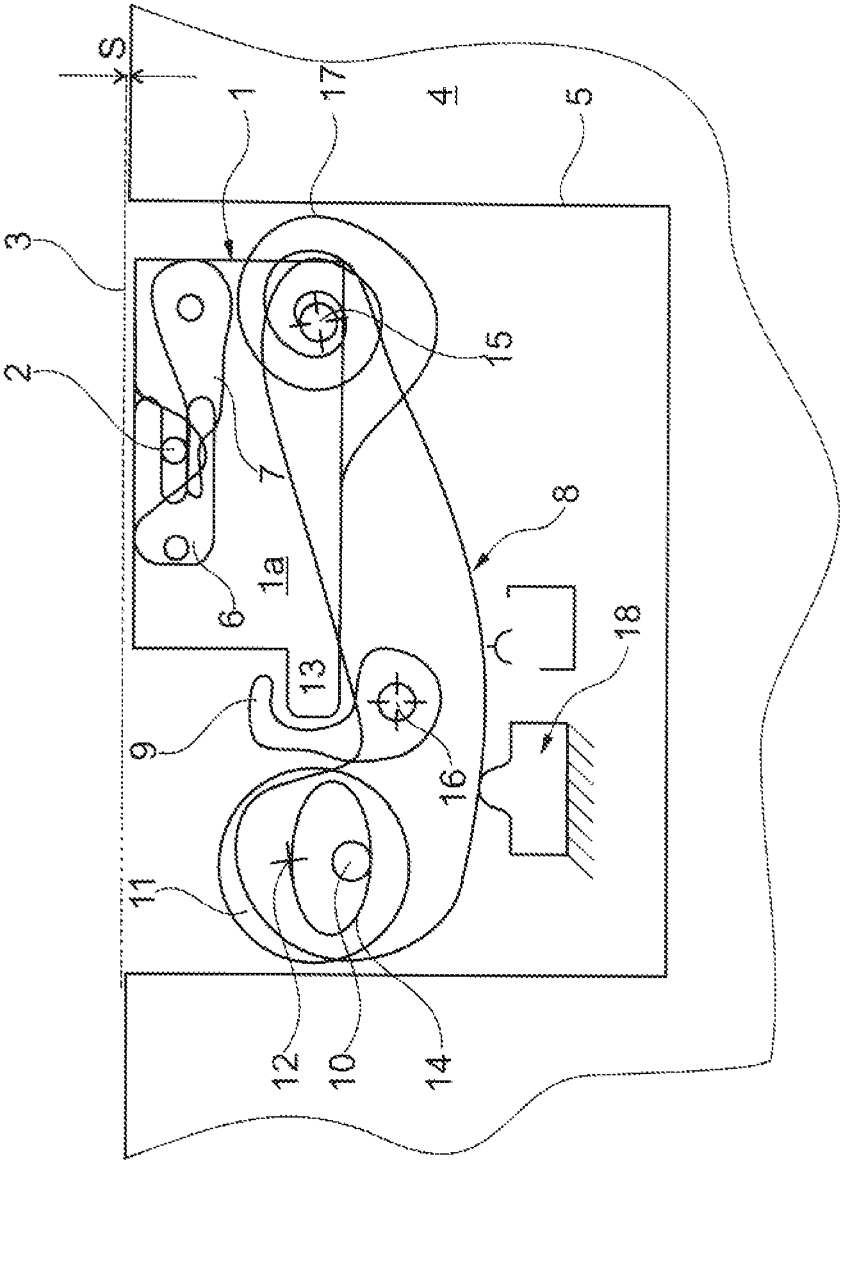

The fixing or arrangement of the latch housing 1 on the body side is shown in FIGS. 1 and 2 in such a way that the figures only indicate a top front support 4 as part of the motor vehicle body 4. The front support 4 contains a recess 5 in which the latch housing 1 on the body side is located.

The latch housing 1 essentially comprises a frame box 1*a*, as shown and a latch cover, not shown, connected or connectable to the frame box 1*a*. Whilst the frame box 1*a* is made of metal and is solid in order to accommodate a locking mechanism 6, 7 mounted therein, the latch cover, not shown, is typically made of plastic. As usual, the locking mechanism 6, 7 comprises a catch 6 and a pawl 7 that are both pivotably arranged in frame box 1*a*, as apparent when comparing FIGS. 1 and 2 and from the rotary axis indicated by the hollow circles in the figures.

The principle design furthermore includes a locking and/or opening device 8, 9. Although the invention is not limited to this, the locking and/or opening device 8, 9 is a closing aid 8, 9, in the example, comprising a rocker 8 and a pawl 9. The arrangement also includes a motorized drive 10, 11. The motorized drive 10, 11 comprises a driving wheel 11 and an actuating pin 10 arranged on the driving wheel 11. The actuating pin 10 extends predominantly perpendicular from the driving wheel 11.

The driving wheel 11 is, in turn, moved in clockwise and counterclockwise direction around its axis 12 by a not explicitly shown electric motor. In order to achieve this, the driving wheel contains a worm, meshing with toothing on the outer side of the driving wheel 11. When moving from the functional position shown in FIG. 1 to the functional position of FIG. 2, the driving wheel 11 carries out a clockwise rotation around its axis 12, taking into consideration a circular arc of around 180° described by the actuating pin 10 that is being carried along.

Specially significant for the invention is the fact that the locking and/or opening device 8, 9 of the closing aid 8, 9 provided by the invention, engages on the outside of the latch housing 1 in order to move the latch housing 1 in relation to the fixed basic element 4 during a closing/opening process. For this purpose, the pawl 9 reaches above or behind a projection 13 on the latch housing 1 or a projection 13, formed mainly in or on frame box 1*a*. The motorized drive 10, 11 acts as a whole eccentrically on the locking and/or opening device 8, 9, as apparent when comparing FIGS. 1 and 2. As part of the process, the actuating pin 10 engages in the respective slot 14 of the rocker 8.

The rocker 8 is pivotably connected to base element 4. The same applies for the latch housing 1. In the design of the example embodiment, the rocker 8 and the latch housing 1 can be rotated around the same axis and are connected to the respective base housing 4. For this purpose, a pin 15 is provided that is anchored in the base element 4 or the front support 4 provided at this point. The rocker 8 and the latch housing 1 or the frame box 1*a* are pivotably mounted on this fixed pin 15. The design may be such that, in the shown top view, the rocker 8 is located below the latch housing 1 and thus also below the frame box 1*a*. This also applies for the pawl 9 which in turn is pivotably mounted on the rocker 8. For this purpose, a further pin 16 is provided. In this arrangement, the projection 13 can extend so far that the pawl 9 can reach above or behind it.

The arrangement functions as follows. FIG. 1 shows the motor vehicle door lock and thus the respective hood 3 in its "open" position. In order to close the hood 3 it is lowered in relation to the body 4 or the front support 4 to such an extent that the locking bolt 2, arranged on the hood, moves as usual into the catch 6 or its infeed section 16. As a result, the catch 6 is pivoted around its axis in clockwise direction until the main ratchet position shown in FIG. 2 has been reached. In the main ratchet position, the pawl 7 engages in the catch 6, preventing the catch 6 from being opened by the force of a spring and releasing the captured locking bolt 2.

In the main ratchet position of the locking mechanism 6, 7, the hood 3 still contains a considerable gap S between the body 4 or the front support 4, as indicated in FIG. 1. The locking and/or opening device 8, 9 or the provided closing aid 8, 9 is in its standby position. Also, the latch housing 1 is, so to speak, swung out in relation to the body 4. In addition, the motorized drive 10, 11 ensures in this position that the hood 3 or the locking bolt 2 cannot flex. This means that the hood 3 or the locking bolt 2 safely reaches the main ratchet position of the locking mechanism 6, 7 shown in FIG. 2. The main ratchet position is now detected in turn with the aid of a sensor, i. e. a switch. As a result, the motorized drive 10, 11 is acted upon, starting from the standby position shown in FIG. 1.

A soon as the drive 10, 11 has received the start signal from the respective sensor or switch on the locking mechanism 6, 7 indicating that the locking mechanism 6, 7 is in the main ratchet position, power is applied to the electric motor. The result is a clockwise movement of the driving wheel 11 around its axis or rotation axis 12. The actuating pin 10, extending through the slot 14 in the rocker 8, then acts altogether eccentrically on the rocker 8 or closing aid 8, 9. At the same time, the actuating pin 10 carries out an approximately 180° circular movement as apparent from the transition from FIG. 1 to FIG. 2.

At the end of this closing operation, shown in FIG. 2, the actuating pin 10 has moved from a top edge of the slot 14 down to the opposite bottom edge, whilst at the same time pivoting rocker 8 around its axis or rotation axis 15 in counterclockwise direction. As during the entire process the pawl 9 has retained the latch housing 1 on projection 13 and as the pawl 9 is also pivotably mounted on the pawl 8 and is moved along with said pawl, the latch housing 1 also carries out a counterclockwise rotation around the common axis 15 together with the rocker 8 during the transition from FIG. 1 to FIG. 2. The closing operation corresponds with this.

The closing movement of the latch housing 1 or of the rocker 8 is carried out against the force of a spring 17. The spring 17 is a spiral spring fixed with one end to the pin 15 connected to the body 4, whilst the other free end of the spiral spring 17 pretensions the latch housing 1 in clockwise direction in relation to the axis or rotation axis 15.

During the described closing operation, an end stop or stop buffer 18 on the body 4 provides an end position damping. Upon reaching the closed position or pulled-close position shown in FIG. 2, the rocker 8 pivoted in counterclockwise direction around axis 15 with the aid of the motorized drive 10, 11, moves against the respective stop or stop buffer 18. The hood 3 is then fully closed in relation to body 4, corresponding to a minimal gap S, as shown in FIG. 2.

FIG. 1 also shows a pyrotechnical element 19 indicated by an arrow. This element ensures that the hood 3 can be opened in the event of an accident. The pyrotechnical element acts on the pawl in order to pivot the pawl away from the projection 13 on the latch housing 1.

The invention claimed is:

1. A motor vehicle door lock for a motor vehicle, the motor vehicle including a vehicle frame and a motor vehicle door, the motor vehicle door lock comprising:

a locking bolt on the motor vehicle door;

a latch assembly comprising:

a catch for capturing the locking bolt, the catch being movable into a main ratchet position in which the locking bolt is held;

a first pawl for securing the catch in the main ratchet position;

a frame member enclosing the catch and the first pawl, the frame member having a projection;

a rocker arm pivotally mounted on the vehicle frame;

a second pawl pivotably coupled to the rocker arm and which selectively couples the frame member to the rocker arm by grasping the projection of the frame member;

a drive configured to rotate the rocker arm;

wherein rotation of the rocker arm while the second pawl grasps the projection moves the frame member and the latch assembly relative to the vehicle frame and reduces a gap between the motor vehicle door and the vehicle frame.

2. The motor vehicle door lock of claim 1, wherein the frame member is pivotally mounted on the vehicle frame.

3. The motor vehicle door lock of claim 2, wherein the frame member and the rocker arm both pivot about a common axis.

4. The motor vehicle door lock of claim 3, further comprising a spring that biases the frame member away from the rocker arm.

5. The motor vehicle door lock of claim 4, wherein the vehicle frame defines a door closed position that corresponds to an inside surface of the motor vehicle door when the motor vehicle door is closed, wherein the rocker arm defines a first position where a portion of the catch is positioned outside the door closed position and a second position where the portion of the catch is positioned inside the door closed position.

6. The motor vehicle door lock of claim 3, wherein the vehicle frame defines a door closed position that corresponds to an inside surface of the motor vehicle door when the motor vehicle door is closed, wherein the rocker arm defines a first position where a portion of the catch is positioned outside the door closed position and a second position where the portion of the catch is positioned inside the door closed position.

7. The motor vehicle door lock of claim 6, further comprising a buffer, wherein the rocker arm abuts the buffer in the second position.

8. The motor vehicle door lock of claim 2, wherein the vehicle frame defines a hood door closed position that corresponds to an inside surface of the motor vehicle door when the motor vehicle door is closed, wherein the rocker arm defines a first position where a portion of the catch is positioned outside the door closed position and a second position where the portion of the catch is positioned inside the door closed position.

9. The motor vehicle door lock of claim 8, further comprising a buffer, wherein the rocker arm abuts the buffer in the second position.

10. The motor vehicle door lock of claim 1, further comprising a driving wheel rotatable by the drive about a wheel axis and a pin mounted on the driving wheel offset from the wheel axis, wherein the pin is configured to abut and move the rocker arm.

11. The motor vehicle door lock of claim 10, wherein the rocker arm has a slot and wherein the pin is positioned within the slot.

12. The motor vehicle door lock of claim 11, wherein the slot is elliptical in shape.

13. The motor vehicle door lock of claim 12, wherein the pin acts eccentrically on the rocker arm when the pulley rotates about the pulley axis due to the elliptical shape of the slot.

14. The motor vehicle door lock of claim 13, wherein the pulley is a driven pulley, driven by a motor.

15. The motor vehicle door lock of claim 14, wherein the vehicle frame defines a door closed position that corresponds to an inside surface of the motor vehicle door when the hood motor vehicle door is closed, wherein the rocker arm defines a first position where a portion of the catch is positioned outside the door closed position and a second position where the portion of the catch is positioned inside the door closed position.

16. The motor vehicle door lock of claim 15, further comprising a buffer, wherein the rocker arm abuts the buffer in the second position.

17. The motor vehicle door lock of claim 15, further comprising a buffer, wherein the rocker arm abuts the buffer in the second position.

18. The motor vehicle door lock of claim 1, wherein the vehicle frame defines a door closed position that corresponds to an inside surface of the motor vehicle door when the motor vehicle door is closed, wherein the rocker arm defines a first position where a portion of the catch is positioned outside the door closed position and a second position where the portion of the catch is positioned inside the door closed position.

* * * * *